United States Patent
Fuchs et al.

(10) Patent No.: US 9,349,101 B2
(45) Date of Patent: May 24, 2016

(54) SYSTEMS AND METHODS FOR PARTITIONING SETS OF FEATURES FOR A BAYESIAN CLASSIFIER

(71) Applicant: salesforce.com, inc., San Francisco, CA (US)

(72) Inventors: Matthew D. Fuchs, Los Gatos, CA (US); Arun Jagota, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 82 days.

(21) Appl. No.: 14/473,717

(22) Filed: Aug. 29, 2014

(65) Prior Publication Data

US 2016/0063389 A1     Mar. 3, 2016

(51) Int. Cl.
*G06N 7/00*     (2006.01)
*G06N 99/00*     (2010.01)

(52) U.S. Cl.
CPC .............. *G06N 7/005* (2013.01); *G06N 99/005* (2013.01)

(58) Field of Classification Search
CPC .............................. G06N 7/005; G06N 99/005
USPC ........................................................... 706/12
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |

(Continued)

OTHER PUBLICATIONS

Dougherty J. et al., "Supervised and Unsupervised Discretization of Continuous Features", Machine Learning: Proceedings of the Twelfth International Conference, 1995, San Francisco, CA.*

(Continued)

*Primary Examiner* — Stanley K. Hill
*Assistant Examiner* — Dave Misir
(74) *Attorney, Agent, or Firm* — Haynes Beffel & Wolfeld LLP; Ernest J. Beffel, Jr.

(57) ABSTRACT

The technology disclosed relates to methods for partitioning sets of features for a Bayesian classifier, finding a data partition that makes the classification process faster and more accurate, while discovering and taking into account feature dependence among sets of features in the data set. It relates to computing class entropy scores for a class label across all tuples that share the feature-subset and arranging the tuples in order of non-decreasing entropy scores for the class label, and constructing a data partition that offers the highest improvement in predictive accuracy for the data set. Also disclosed is a method for partitioning a complete set of records of features in a batch computation, computing increasing predictive power; and also relates to starting with singleton partitions, and using an iterative process to construct a data partition that offers the highest improvement in predictive accuracy for the data set.

15 Claims, 10 Drawing Sheets

(56) References Cited

U.S. PATENT DOCUMENTS

| | | |
|---|---|---|
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,460,049 B1 * | 10/2002 | Becker ............ G06F 17/3071 707/778 |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,560,468 B1 * | 10/2013 | Lerman ................. G06N 5/02 706/12 |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0138492 A1 * | 9/2002 | Kil .................. G06K 9/6253 |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0019598 A1 * | 1/2004 | Huang .............. G06K 9/6282 |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0247216 A1 | 9/2013 | Cinarkaya et al. |

OTHER PUBLICATIONS

Boley D. et al., "Partitioning-based clustering for Web document categorization", Decision Support Systems, 27, 1999, pp. 329-341.*

Singh, Sarvjeet, et al., "Orion 2.0: Native Support for Uncertain Data," Purdue University, Department of Computer Science, Copyright Jun. 9-12, 2008, 3 pages.

* cited by examiner

200A

Triple or 3- tuple
Pair or 2- tuple
Singletons or 1- tuple

| First_Name | Last_Name | Email Address | ... |
|---|---|---|---|
| Rachel | Reid | rreid@cruzio.com | |
| Mohammed | Hussain | mhussain@box.net | |
| Eli | Brown | ebrown@box.net | |
| Jeff | Murphy | jmurphy@bigemail.com | |
| Chris | Chen | chris@chen.com | |

Singletons or 1- tuple — 202

| First_Name |
|---|
| Rachel |
| Mohammed |
| Eli |
| Jeff |
| Eli |
| Rachel |
| Chris |
| Rachel |
| Chris |
| Eli |
| Rachel |

Threshold Count is ≥ 2 — 204

Rachel (9)  ✓
Chris (5)   ✓
Eli (3)     ✓

Mohammed (1)  ✗
Jeff (1)      ✗

FIG. 2B

| $X_1$ | $X_2$ | C Class Label | $L_{\{(X_1),(X_2)\}}$ Independent Features | $L_{\{(X_1,X_2)\}}$ Dependent Features |
|---|---|---|---|---|
| 0 | 0 | 1 | 1/4 | 1/2 |
| 0 | 1 | 0 | 1/4 | 1/2 |
| 1 | 0 | 0 | 1/4 | 1/2 |
| 1 | 1 | 1 | 1/4 | 1/2 |

| Tuple Number | $X_1$ | $X_2$ | $X_3$ | $X_4$ | Class Label | Count |
|---|---|---|---|---|---|---|
| 1 | a | | | | 1 | 10 |
| 2 | a | | | | 0 | 5 |
| 3 | a | b | | | 1 | 5 |
| 4 | a | b | | | 0 | 1 |
| 5 | a | | c | | 0 | 3 |
| 6 | | | c | | 1 | 10 |
| 7 | | | c | | 0 | 3 |
| 8 | | | | d | 1 | 8 |
| 9 | | | | d | 0 | 10 |
| 10 | | | c | d | 1 | 7 |
| 11 | | | c | d | 0 | 1 |

500

User Registration Features for Identifying Fraudulent Registrations

RegHour - hour of day when the user registered
RegDayofWK - day of week when the user registered
FirstName - first name used for registration
LastName - last name used for registration
Email - email address used for registration
EmailDomain - domain of email address used for registration
EmailPrefix - prefix of email address used for registration
IPBL1 - first block of IP address.
IPBL2 - second block of IP address
IPBL3 - third block of IP address
IPBL4 - fourth block of IP address
lenFN - number of words in first name
lenLN - number of words in last name

FIG. 5A

Contact Features for Identifying Purchase Likelihood for Contacts first_name - Contact's first name
last_name - Contact's last name
title - Contact's job title
company - Name of contact's company
phone area code - area code of contact's phone number
city - city in which contact works
zip - zip in which contact works
rank - rank of contact (C-level, VP-level, Director-level, Manager-Level, ...)
department - department of contact (Sales, Marketing, Engineering, ...)
email_domain - domain of email of contact

FIG. 5B

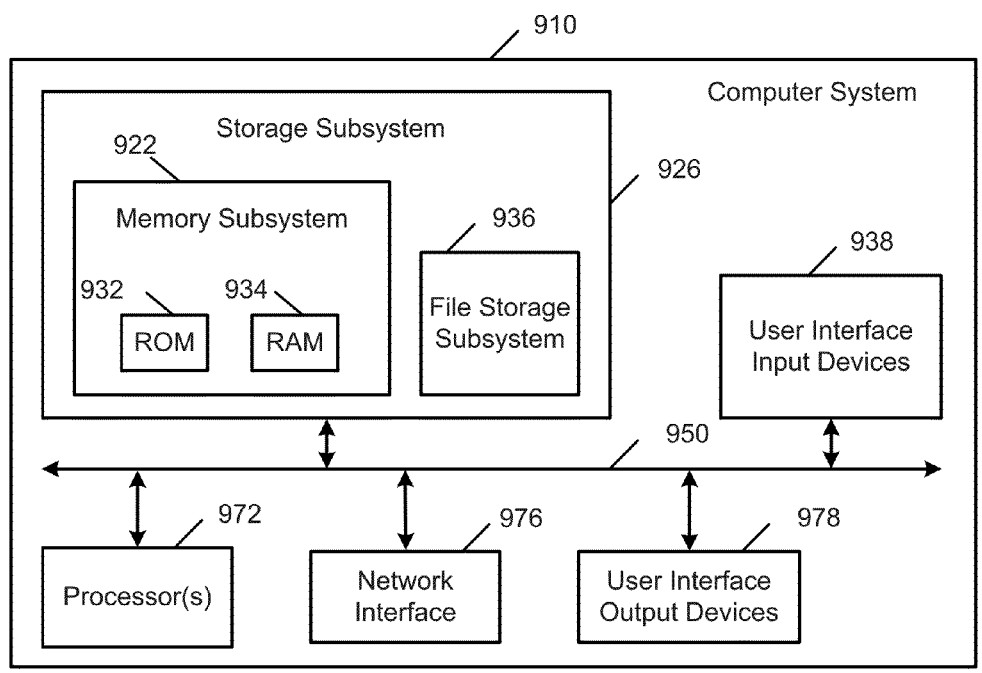
FIG. 9 Computer System

SYSTEMS AND METHODS FOR PARTITIONING SETS OF FEATURES FOR A BAYESIAN CLASSIFIER

RELATED APPLICATION

This application is related to U.S. patent application Ser. No. 14/244,146, entitled, "Systems and Methods for Identifying Anomalous Data in Large Structured Data Sets and Querying the Data Sets," filed on Apr. 3, 2014. The nonprovisional application is hereby incorporated by reference for all purposes.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

The Naive Bayes Classifier (NBC) is a stalwart of the machine-learning community, often the first algorithm tried in a new arena, but also one with the inherent weakness of its hallmark assumption—that features are independent. Bayesian networks relax this assumption by encoding feature dependence in the structure of the network. This can work well in classification applications in which there is substantial dependence among certain sets of features, and such dependence is either known or is learnable from a sufficiently large training set. (In the latter case, one may use any of a number of structure-learning algorithms; they don't always work well because the structure-learning problem is very difficult.) Undirected graphical models are a different way to relax this assumption. Like Bayesian networks, they also require domain knowledge or a structure-learning procedure. Domain knowledge can be hand coded into the structure, but this only works when domain knowledge is available and even then hand coding is usually very laborious. Alternatively, structure-learning algorithms require extensive training data and present a computationally complex problem, in addition to the concern of over-fitting a model using a limited data set, thereby creating a model that predicts structures that are less likely to work well on data not seen during training. Undirected graphical models may also fail to work well when either the domain knowledge is wrong or when the instance of the structure-learning problem is either intrinsically hard or there is insufficient data to train it.

The technology disclosed relates to machine learning (ML) systems and methods for determining feature dependencies—methods which occupy a space in between NBC and Bayesian networks, while maintaining the basic framework of Bayesian Classification.

Big data systems now analyze large data sets in interesting ways. However, many times systems that implement big data approaches are heavily dependent on the expertise of the engineer who has considered the data set and its expected structure. The larger the number of features of a data set, sometimes called fields or attributes of a record, the more possibilities there are for analyzing combinations of features and feature values.

Accordingly, an opportunity arises to automatically analyze large data sets quickly and effectively. Examples of uses for the disclosed classification systems and methods include identifying fraudulent registrations, identifying purchase likelihood for contacts, and identifying feature dependencies to enhance an existing NBC application. The disclosed classification technology consistently and significantly outperforms NBC.

SUMMARY

The technology disclosed relates to systems and methods for partitioning sets of features for a Bayesian classifier, finding partitions that make the classification process faster and more accurate, while discovering and taking into account feature dependence among certain sets of features in the data set.

Instances of data in the data set have features and a class label. Typically feature values are assigned to the features, and a class value is assigned to the class label. A tuple is a set of feature-value pairs. A subtuple is comprised of unique feature subsets in an input tuple. A partition is a disjoint set of tuples that "covers" the features. That is, if the full set of feature-value pairs is $\{X_1=a, X_2=b, X_3=c\}$, then $\{X_1=a, X_3=c\}$ is an example of a tuple, $\{X_1=a\}$ is an example subtuple, and $p=\{\{X_1=a, X_3=c\}, \{X_2=b\}\}$ is an example of a partition.

Counts for a tuple are provided as input to the system. These counts represent the number of instances, in a training set, of the unique combination of feature values with specific class values. The disclosed systems and methods make use of these counts, accessing a set of tuples that have feature values, class values and counts—stored in a tuple instance count data structure.

The disclosed technology relates to an iterative process of identifying input subtuples with a minimum threshold support count in the records of a large data set, computing class entropy scores of each such subtuple toward the class label, arranging the subtuples in order of non-decreasing class entropy score, constructing the partition list by adding feature subsets corresponding to the input subtuples in order of non-decreasing class entropy score, and pruning from subsequent consideration other input subtuples that include any features that overlap with any features in the current ordered input subtuple. The process is complete when all of the features of the input tuple have been added to the partition list. The resulting partition list can be stored in a memory, for use with a classifier.

The disclosed system relates also to an iterative process of identifying input subtuples with a minimum threshold support count in the records of a large data set, computing the predictive power of each such subtuple toward the class label, arranging the subtuples in order of non-increasing predictive power, constructing the partition list by adding feature subsets corresponding to the input subtuples in order of non-increasing predictive power, and pruning from subsequent consideration other input subtuples that include any features that overlap with any features of the input tuple that have been added to the partition list. The process is complete when all of the features of the input tuple have been added to the partition list. The resulting partition list can be stored in a memory, for use with a classifier.

A variation of the disclosed system and method relates to starting with singleton partition $p=\{\{x_1\}, \{x_2\} \ldots \{x_n\}\}$ over the features (i.e. independent combination of singleton input features in the input tuple for at least the input features having assigned feature-values.). The partition list is evaluated over the complete training set, so is referred to as a "batch" process. This method involves computing probabilities of the feature given x union y, and the reduction in class entropy score from the change x, y→x union y, using data provided by a tuple instance count data structure stored in memory that specifies counts for instances of tuples with specific feature values and class values. The method includes using an iterative process to construct a data partition list that offers the highest improvement in predictive accuracy for the data set: evolving the data partition by merging a selected pair of feature subsets into a merged pending feature subset in the partition list that yields the most reduction in class entropy score as long as the calculated change in entropy introduced by merging the two tuples remains higher than a parameter θ whose value is provided to the system. The resulting partition list can be stored in a memory, for use with a classifier.

The disclosed system and method also relates to starting with independent singleton partition $p=\{\{x1\}, \{x2\} \ldots \{x_n\}\}$ over the features (i.e. independent combination of single-feature tuples), also evaluating over the complete training set—another "batch" process. In the iteration step, this variation of the process includes calculating the increase in predictive power for the class value that would result from merging pairs of pending feature subsets using the tuple instance count data structure, liming consideration of mergers resulting in merged feature subsets that have a least a threshold support count of instances of the class value for at least one set of feature-value pairs over distinct pairs in the training set, and then discarding pairs in which the threshold support minimum is not met. The process is complete when available mergers of pending feature subsets would not produce an increase in predictive power that meets the predetermined predictive power increase threshold. The resulting partition list can be stored in a memory, for use with a classifier.

Other aspects and advantages of the present technology can be seen on review of the drawings, the detailed description and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 2A is a representation of potential tuples generated without the use of thresholding.

FIG. 2B illustrates data thresholding applied dynamically to a singleton or 1-tuple data set.

FIG. 5A illustrates an example set of user registration features for identifying fraudulent registrations.

FIG. 5B illustrates an example set of contact features for identifying purchase likelihood for contacts.

FIG. 9 is a block diagram of an example computer system capable of finding data partitions used in classification systems, while discovering and taking into account feature dependence among certain sets of features in the data set.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Examples of systems, apparatus, and methods according to the disclosed implementations are described in a "user registration contacts" context. The examples of contacts are used solely to add context and aid in the understanding of the disclosed implementations. In other instances, data with numerous elements may include insurance claims, customer service call routing, etc. or any data that would have a significant number of features. Other applications are possible, so the following examples should not be taken as definitive or limiting either in scope, context or setting. It will thus be apparent to one skilled in the art that implementations may be practiced in or outside the "user registration contacts" context.

The technology disclosed relates to classification systems and methods for finding data partitions that make possible the calculation of more accurate probabilities for specific classes. That is, the disclosed systems offer faster and more accurate methods, while discovering and taking into account feature dependence among certain sets of features in the data set.

The technology disclosed makes use of a tuple instance count data structure stored in memory that delivers counts for structured records organized into features (that also could be properties, fields, objects or attributes.) The structured records in the data set include a class label. Typically feature values are assigned to the features, and a class value is assigned to the class label. Tuples are generated from one or more records of features (that also could be fields, objects or attributes) of a data set with values that occur sufficiently frequently; i.e. that have sufficient support to satisfy a minimum threshold. Thresholding is applied to manage the number of tuples generated.

A labeled tuple has a unique combination of feature values and a class value. That is, labeled tuples are generated from combinations of features with feature values and class values. The disclosed systems and methods access a set of labeled tuples that have feature values, class values and counts. Counts describe the number of instances in a training set of the unique combination of feature values and class values for each labeled tuple.

Techniques for determining automatic generation of tuples from a record set are described in further detail in U.S. patent application Ser. No. 14/244,146, entitled, "Systems and Methods for Identifying Anomalous Data in Large Structured Data Sets and Querying the Data Sets," filed on Apr. 3, 2014, which is hereby incorporated by reference.

Data Partition Generation Environment

Figure 1:
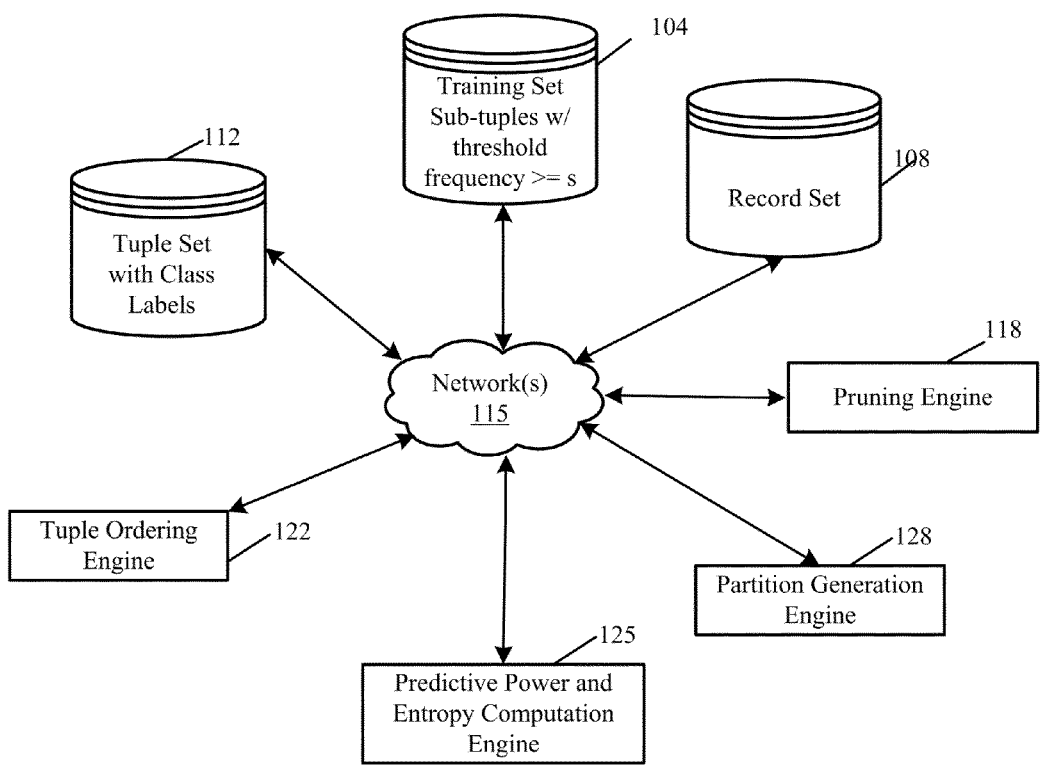
FIG. 1 shows one implementation of an example environment for partition list generation.

FIG. 1 shows one implementation of an example data partition generation and data classification environment 100. FIG. 1 also shows training set sub-tuples with threshold frequency >=s 104, record set 108, tuple set with class labels 112, network(s) 115, pruning engine 118, tuple ordering engine 122, predictive power and entropy computation engine 125, and partition generation engine 128.

In some implementations, network(s) 115 can be any one or any combination of Local Area Network (LAN), Wide Area Network (WAN), WiMAX, WiFi, telephone network, wireless network, point-to-point network, star network, token ring network, hub network, mesh network, peer-to-peer connections like Bluetooth, Near Field Communication (NFC), Z-Wave, ZigBee, or other appropriate configuration of data networks, including the Internet.

Record sets 108, training set sub-tuples 104, and tuple sets with class labels 112 can store information from one or more tenants into tables of a common database image to form an on-demand database service, which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

The engines 118, 122, 125, and 128 can be of varying types including a workstation, server, computing cluster, blade server, server farm, or any other data processing system or computing device. The engines can be communicably coupled to the databases via a different network connection. For example, tuple ordering engine 122 can be coupled via the network 115 (e.g., the Internet) and predictive power and entropy computation engine 125 can be connected to a direct network link.

Record set 108 is a large data set, such as a contact repository from Dun & Bradstreet or Jigsaw. It can include contact information aggregated and crowd sourced from many different users and sources. By large data set, we mean a data set having over 100,000 elements, objects or records. As a practical matter, a large data set has less than 100 trillion elements, objects or records. Record set 108 includes structured data, such as contact or account data in some implementations. In one implementation, contact or account data can be organized into record features (that also could be fields, objects or attributes). Examples of record features, as shown in FIG. 5A, can include hour of day when a user registered, day of week when a user registered, first name, last name, email address used for registration, email domain used for registration, email prefix used for registration, first block of IP address, second block of IP address, third block of address, fourth block of IP address. Other examples of features are data generated from record properties. For example, two features could be the number of words in first name, and the number of words in the last name. In another implementation, examples of record features as shown in FIG. 5B, can include first name, last name, job title, company name, phone area code, city in which contact works, zip code where contact works, rank of contact (i.e. VP, Manager, Director), department of contact, and email domain of contact.

Some implementations make use of training set sub-tuples with threshold frequency >=s 104 that include structured data such as tuples generated from combinations of feature values in the record set 108. Techniques for determining automatic generation of tuples from a record set are described in further detail in U.S. patent application Ser. No. 14/244,146 listed above. For instance, tuple set 104 can include a 3-tuple with three record features that store a person's first name as the first feature, last name as the second feature, and the person's email address as the third feature. A threshold of 5 for this 3-tuple example would show that there are five records in the sub-tuples data set that contain the same feature values for first name, last name and email address. In some implementations, training set sub-tuples 104 can include both existing tuples and expanded tuples.

Tuple set with class labels 112 includes tuples generated from combinations of feature values in the record set 108 with a priori class labels. For instance, a tuple set may include 5 features: user registration first name, last name, third block of IP address, fourth block of IP address, and a class label. An example class label may be fraudulent or not, with class value c=1 for fraudulent or class value c=0 for not fraudulent—referring to whether the user registration has been previously determined to be fraudulent. Another example of class label may be purchased or not purchased to signal whether a user's contact information from registration is likely to be purchased within a year, or not.

Pruning engine 118 deletes, from a set of tuples with threshold support >=s 104, those tuples whose features overlap with features of existing tuple sets. Predictive power and entropy computation engine 125 computes the class entropy and predictive power of each tuple. Tuple ordering engine 122 places tuples in order of non-decreasing class entropy. Partition generation engine 128 constructs partitions, with non-overlapping tuples and least-entropy calculations interleaved. Tuples and thresholding are explained in more detail below.

Tuples and Thresholding

FIG. 2A is a representation of example tuples generated 200A without the use of thresholding (which is the same as a threshold of 0.) Note that class labels, and therefore class values, are not included in the FIG. 2 examples.

FIG. 2B illustrates data thresholding applied to a singleton or 1-tuple data set, where a threshold count criterion of two is applied to a record set 202 that includes the First_Name feature. In record set 202, only some of which is shown, "Rachel" has nine occurrences as in the First_Name record feature, and therefore exceeds the threshold count criterion of two. The remaining 1-tuple records include Chris with five occurrences, Eli with three occurrences and Mohammed and Jeff each having only one occurrence. Because Chris and Eli also exceed the threshold count criterion of two, while Mohammed, and Jeff each have only one occurrence. When the First_Name feature is combined with an m-tuple to produce an expanded n-tuple, unique values of Mohammed and Jeff are not be used to generate n-tuples. This qualification can applied during generation of an n-tuple, processing only the 1-tuples in list 204, which includes Rachel (9), Chris (5), and Eli (3).

In practice, the threshold count criterion can be in a range of 2 to 20. Alternatively, a range of 4 to 14 or a narrower range such as 5 to 9 can be used. Special cases exist in which the threshold could be 0 or 1. A threshold count criterion of 20 is large enough for most purposes. For a very large data set, a threshold count criterion in a range of 20 to 100 could be used.

Figure 2C:
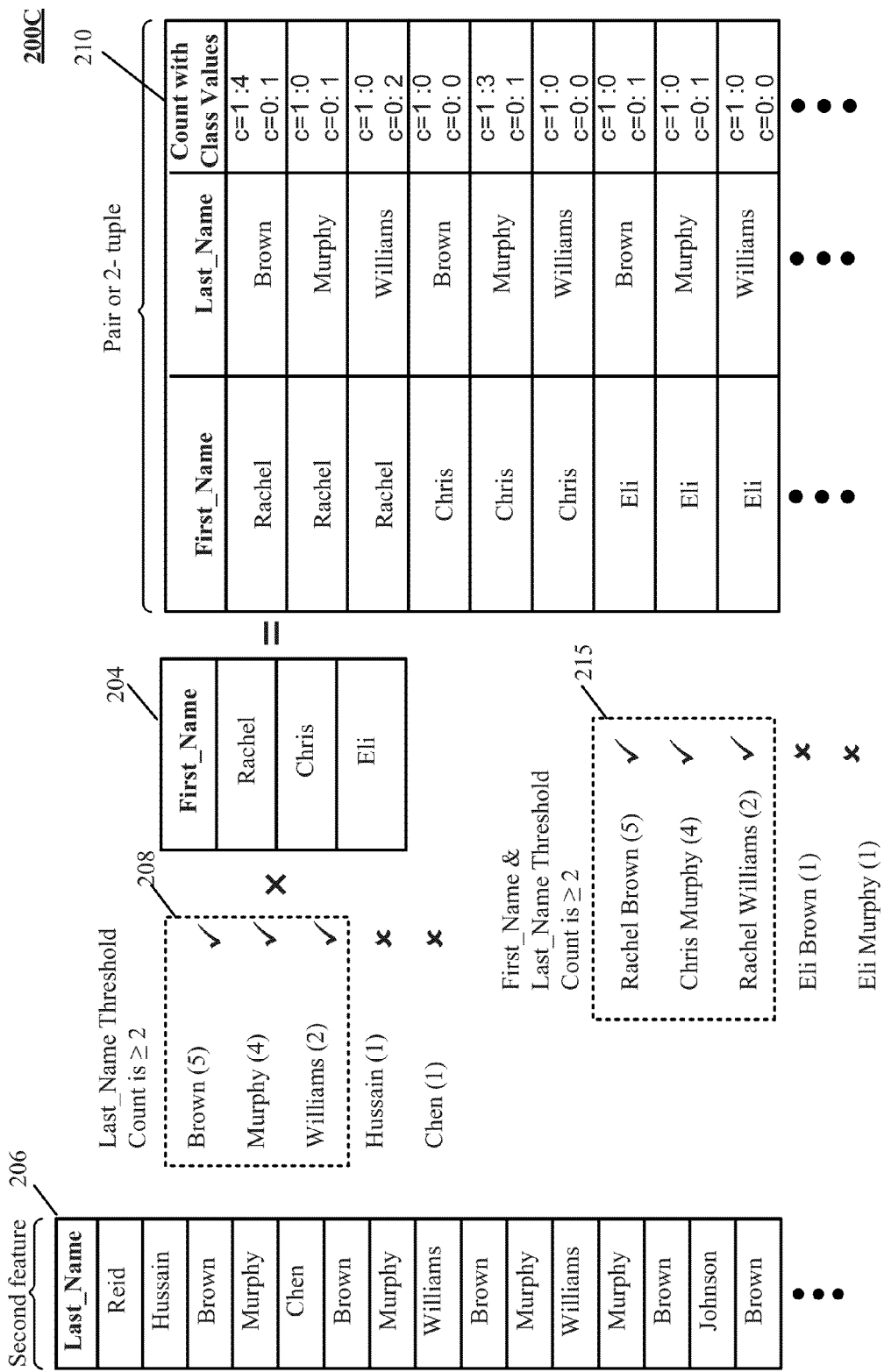
FIG. 2C illustrates thresholding for a double or 2-tuple data set.

FIG. 2C illustrates thresholding a double or 2-tuple data set. In the record set 206 a Last_Name threshold count criterion of two is applied to unique values of Last_Name. In the 1-tuple list of Last_Name values 206, Brown has five occurrences, Murphy has four occurrences, and Williams has two occurrences, satisfying the threshold count criterion of two. Hussain and Chen each have only one occurrence in data set 206 and are therefore pruned from the list. The thresholded list 208 includes Brown (5), Murphy (4), and Williams (2) as unique values of last names that satisfy the threshold count criterion. Next, the values in the First_Name list 204 that satisfy the threshold are combined with the pruned Last_Name 208 to produce a combined 2-tuple list 210 of First_Name and Last_Name. A threshold count criterion of two (which is the same as, but could be different than the threshold for 1-tuples) is applied to potential 2-tuples 210 to produce a list of inhabited 2-tuples 215.

Class values for the class label are typically provided as input values to a classification system, as part of the training data. For example, training set data for determining data partitions that make the identification of fraudulent registrations include a class label with class values for fraudulent or not, with c=1 for fraudulent registration data records, and c=0 for legitimate registration data records. Counts for tuples are shown in 210 into counts for c=1 and for c=0.

The final column shows class values along with the counts 210. Class value information is typically a priori information provided to the tuple-generation process. This list includes Rachel Brown (5 total, with 4 for class value=1 and 1 for class value=0), Chris Murphy (4 total, with 3 for class value=1 and 1 for class value=0), and Rachel Williams (2 total, with 0 for class value=1 and 2 for class value=0) since each (First_Name, Last_Name) pair satisfies the threshold count criterion of two. Because Eli Brown and Eli Murphy each only occurred once in the 2-tuple extract of record set 210, they are pruned from the list.

Partition-Finding Systems and Methods

The disclosed structure-learning systems and methods have a training phase and a classification phase. During the training phase, a tuple instance count data structure has been created based on the training dataset for the classification problem. In the classification phase, we classify an input using data counts from this trained tuple instance count data structure stored in memory. Unlike most supervised learning systems, these structure learning methods operate during the classification phase (i.e. work with records one at a time as they become available to be classified) to find partitions that make the classification process faster and more accurate.

An alternative method for the disclosed structure-learning system and method uses only the training set to find good partitions; that is, using batch data. When using a batch method, a complete data set is analyzed to determine the optimal partitions, given that instance and data set. When a new data set is introduced, the process must be restarted. That is, for each new training set introduced, previous partitions are erased and a new set of partitions is determined based on the data set in use.

Bayesian Classification, Naïve Assumption, and Partition Factoring

The underlying framework of Bayesian classifiers is Bayes Rule:

$$P(C|X)=P(X|C)*P(C)/P(X) \quad (1)$$

Here $X=(X_1, \ldots, X_n)$ is a random vector of n features, and C a random variable of the class. (these random variables are assumed to be multinomial.) Without further assumptions, it is typically difficult to estimate P(X|C), because it usually has lots of probabilities. (For example, even if $X_1, X_2, \ldots, X_n$ are each binary-valued, P(X|C) would have $2^n$ probabilities, a huge number even when n is as small as 30 ($2^{30}$>1 billion). Estimation of lots of probabilities requires huge training sets. By assuming suitable independencies, we can drastically reduce the number of probabilities to be estimated. NBC takes it to the extreme; it assumes that the features are independent.

More formally, NBC factors the P(X|C) in equation (1) above as $$P(X|C)=P(X_1|C)*P(X_2|C)* \ldots *P(X_n|C) \quad (2)$$

A partition of $X=\{X_1, \ldots, X_n\}$ is a collection of disjoint subsets of X whose union equals X. A partition induces the following dependencies: features in the same subset are deemed dependent; features in different subsets are deemed independent. In the disclosed methods, we consider the generalization of equation (2) above for $\pi=\{\{X_1, \ldots, X_k\}, \{X_{k+1}, \ldots, X_l\}, \ldots, \{X_{m+1}, \ldots, X_n\}\}$ a certain partition of $\{X_1, \ldots, X_n\}$ to $$P(X|C,\pi)=P(X_1, \ldots, X_k|C)*P(X_{k+1}, \ldots, X_l|C)* \ldots *P(X_{m+1}, \ldots, X_n|C) \quad (3)$$

Equation (3) above allows us to model dependencies among various subsets of features. In view of this, we expect a classifier using equation (3) to outperform NBC in applications in which such dependencies hold.

To use the generalization to partitions expressed in equation (3) in equation (1) above, we need to determine π—the determination of which is a learning problem analogous to the structure learning problem in graphical models. First, we define $L_\pi$ as the likelihood of the training set, i.e.

$$L_\pi = \Pi_{(X,C) \in T} P(X|C,\pi) \quad (4)$$

where T is the training set of (X, C) pairs. To find an optimal partition one would need to find a π that maximizes this likelihood; that is, find $\pi^* = \text{argmax}_\pi L_\pi$. Finding such a maximum likelihood partition is generally an intractable problem. Bayesian networks and undirected graphical models employ non-optimal methods that remain very complex (and very slow). The disclosed methods make use of novel heuristic methods to find effective partitions instead. They are simpler to implement than graphical model systems, and much faster.

Data Partition Example

Figures 3, 4A, 4B:
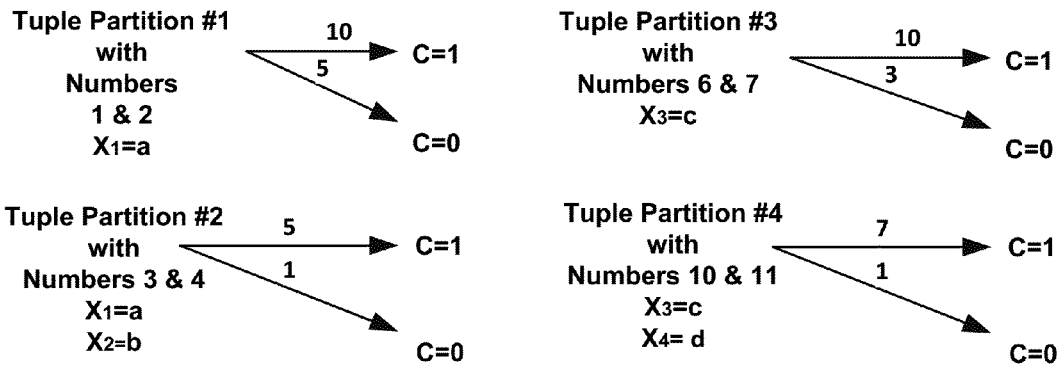
FIG. 3 illustrates a simple classification example in which the combination of the two features predicts the classes better than the two features taken independently.
FIG. 4A shows an example data set of tuples with class label and frequency counts.
FIG. 4B displays a map of the frequency for c=1 and c=0 for two example tuples.

FIG. 3 illustrates a simple classification example in which we analyze a tuple set with class labels 112. The first two columns show two features $X_1$ 302, and $X_2$ 304, with possible binary values of zero or one. Column three is Class Label C 306, with class values. Column 4 shows the computed likelihood when feature independence $\{\{x_1\}, \{x_2\}\}$ 308 is assumed, and the last column shows the computed likelihood for each pair of features, $\{x_1, x_2\}$ 309, when the features are assumed to be dependent.

For partition $\{\{X_1\},\{X_2\}\}$, consider the input ($X_1=0$, $X_2=0$) at classification time. To illustrate the computation when $X_1$ and $X_2$ are both 0, and the class label is 1, first consider $X_1$ and $X_2$ to be independent. In this case, $P(X_1=0, X_2=0|C=1)=P(X_1=0|C=1)*P(X_2=0|C=1)$. Note that $P(X_1=0|C=1)$ is ½ since there are two rows in which C=1, and one of these has $X_1=0$. $P(X_2=0|C=1)$ is also ½ by similar reasoning. So $P(X_1=0|C=1)*P(X_2=0|C=1)$ is ¼.

Next consider $X_1$ and $X_2$ to be dependent. $P(X_1=0, X_2=0|C=1)$ is ½ since there are two rows in which C=1, and one of these has $(X_1=0, X_2=0)$.

Similar reasoning may be applied to compute the other likelihoods.

So we see that the dependent case, $\{X_1, X_2\}$, has a higher likelihood than the independent one. From Bayes rule, we may see that a model that has a higher likelihood is also the one that predicts the classes better. To distill the key insight from this example, suppose we are currently considering a certain partition. If by merging two sets in this partition we are able to significantly improve the class prediction accuracy, we have found a better partition (at least for this data set).

A Partition Finding System and Method

The disclosed technology for finding effective partitions makes use of the sets of features (and their counts) stored in the trained tuple instance count data structure described earlier. More generally, the tuple instance count data structure is trained on the set of $(x_1, x_2, \ldots, x_n, c)$ tuples that comprise the training set of the classification problem. Here, $x_i$ is the value of feature $X_i$ in the corresponding input and c is the input's class label. Threshold support s is a parameter whose value is provided to the classification system. Using the value of s as the threshold support parameter during training, the tuple instance count data structure records the sets of features that occur in this training set with frequency at least s, along with their frequencies, in the training set sub-tuples with threshold frequency >=s 104.

Let $x_s = (x_{i1}, x_{i2}, \ldots, x_{ik})$ denote any particular sub-tuple of $(x_1, \ldots, x_n)$ where s is the index label of this sub-tuple. From the trained tuple instance count data structure, $P(C|x_s)$ can be readily approximated if $x_s$ plus at least one class label is stored after training. If, for a given $x_s$, the tuple instance count data structure has counts stored for $(x_s, c)$ only for some c's in C (class label), but not all, then low-support tuples are treated as if they never occurred, by assigning the remaining counts as 0. The predictive power and entropy computation engine 125 computes the entropy $H(C|x_s)$ of $P(C|x_s)$. That is, entropy provides a measure of the available information for a class label, for a given partition set.

As examples of the use of class label, in one implementation we can use the class label with class value c=1 (fraudulent) or c=0 (not fraudulent) to find fraudulent user registrations. In another implementation we can use the class label with class value c=1 (contact info purchased) or c=0 (not purchased) to identify user contact information likely to be purchased within one year.

For an input set $(x_1, \ldots, x_n)$ the disclosed method begins by finding the tuples with class labels 112 and support of at least a threshold value s, in the training set sub-tuples with threshold frequency >=s 104. Such tuples include at least one $x_i$ and a class value.

As the next step of the disclosed system, predictive power and entropy computation engine 125 computes the class entropy of each such tuple minus its class value; that is, the class entropy of $(x_{i1}, \ldots, x_{ik})$. Tuple ordering engine 122 then organizes the tuples in order of non-decreasing class entropy.

The partition generation engine 128 constructs the partition, interleaving the least-entropy calculations and the pruning process to avoid overlapping features. That is, let $S=t_1, \ldots, t_k$ denote the tuples found and ordered as described above, with $t_1$ as the first set in the partition. Then, the pruning engine 118 deletes the tuples whose features overlap with features in $t_1$. Using the tuple ordering engine 122 we find the tuple $t_j$ in S with least entropy, and mark $t_j$ as the next set in our partition. After each iteration of identifying another tuple $t_x$ in the partition, the pruning engine 118 deletes the remaining tuples whose features overlap with features in $t_x$.

FIG. 4A shows an example data set of tuples, listed by Tuple Number: features $X_1$ 402, $X_2$ 404, $X_3$ 405, and $X_4$ 406 have binary values, the Class Label column 407 shows class values for fraudulent (c=1) or not (c=0), and Count 408 lists the frequency for a tuple occurrence in the tuple instance count data structure. Some possible tuple combinations ($2^4$=16 for 4 features) are not included in the table, because their counts are below the support threshold minimum count. For example, because the count for $\{X_1=a, X_3=c, c=1$ (fraudulent)$\}$ is zero, no tuple is listed for that feature combination in the table. The goal of this example is to determine what partition will best predict fraudulent data.

FIG. 4B displays a map of the frequency for c=1 and c=0 for four interesting tuple partitions. We can use the count data shown in FIG. 4A to calculate the probability of c=1 (fraudulent). For tuple partition #1 $\{x_1=a\}$, $P(C|x_1=a)=P(c=1|x_1=a)=10/(10+5)=2/3=0.666$. For comparison, we can calculate the probability of c=1 (fraudulent) for tuple partition #2 $\{x_1=a, x_2=b\}$. That is, $P(C|x_1=a, x_2=b)=P(c=1|x_1=a, x_2=b)=5/(5+1)=5/6=0.833$. We observe that tuple partition #2 $\{x_1=a, x_2=b\}$ (5/6>2/3) predicts fraud better than tuple partition #1, so tuples #1 and #2 get pruned. Next, any remaining tuples that contain features already included as part of a processed tuple get pruned, so tuple #5 also gets pruned because it includes feature $x_1=a$. Then, we consider a tuple partition #3. $P(C|x_3=c)=P(c=1|x_3=c)=10/(10+3)=10/13=0.769$, which is less than 0.833 from our earlier partition calculation, so tuples #6 and #7 get pruned. Finally we consider tuple partition #4 with tuples #10 and #11. $P(C|x_3=c, x_4=d)=P(c=1|x_3=c, x_4=d)=7/8=0.875$. We observe that tuple partition #4 offers the most effective predictive partition.

Use Cases

FIG. 5A displays an example list of user registration features for finding effective partitions for identifying fraudulent registrations. User registration features are combined with a class label, where a label value is fraudulent or not, which is information provided by data stewards who have caught fraudulent users.

For this use case, we chose these features based on the following considerations. Inspection of the training set revealed, as suspected, that certain IP addresses have a much higher density of fraudulent users than others. It was also found that certain email domains (e.g. disposable email domains) have a higher density of fraud than others. Other features were found (or suspected) to have somewhat weaker power towards predicting fraud.

We randomly split our data set into two: half for training and half for testing. We trained two classifiers on the training set—NBC and the disclosed system. We then evaluated each set of results using the (same) test set. At 90% precision, the disclosed method had 56% recall compared to NBC that had 45.7% recall. That is, keeping the error rate fixed to 10%, the disclosed system detected significantly more fraudulent users than did NBC. This was expected, since the disclosed system starts from the features used by NBC and finds and uses combinations of features that let it detect fraudulent users more accurately.

FIG. 5B illustrates a data set for the disclosed system for the problem of predicting whether a contact is likely to be purchased within time t (e.g. one year) of its addition to the database. The use case data set consists of a set of (contact features, label) pairs, where label is purchased or not. In this context, purchased means "purchased at least once within time t of its addition". The features were chosen based on a suspicion (in some cases, supported by real evidence or strong intuition) that they would individually predict the purchase likelihood of the contact. For instance, it is well known that rank predicts purchasability. Executive-level contacts are much more likely to be purchased than individual contributor contacts.

Flowcharts for Partition Finding Methods for Available Tuples

Let $x_s = (x_{i1}, x_{i2}, \ldots, x_{ik})$ denote any particular sub-tuple of $(x_i, \ldots, x_n)$ where s is the index set of this sub-tuple. From the trained tuple instance count data structure, $P(C|x_s)$ can be readily approximated if $x_s$ plus at least one class label is stored after training. If, for a given $x_s$, the tuple instance count data structure has counts for $(x_s, c)$ only for some c's in C (class label), but not all, low-support tuples are treated as if they never occurred, by assigning the remaining counts as 0. The predictive power and entropy computation engine 125 calculates the entropy $H(C|x_s)$ of $P(C|x_s)$. That is, entropy provides a measure of the reciprocal of the information about a class label provided by $x_s$.

Figure 6A:
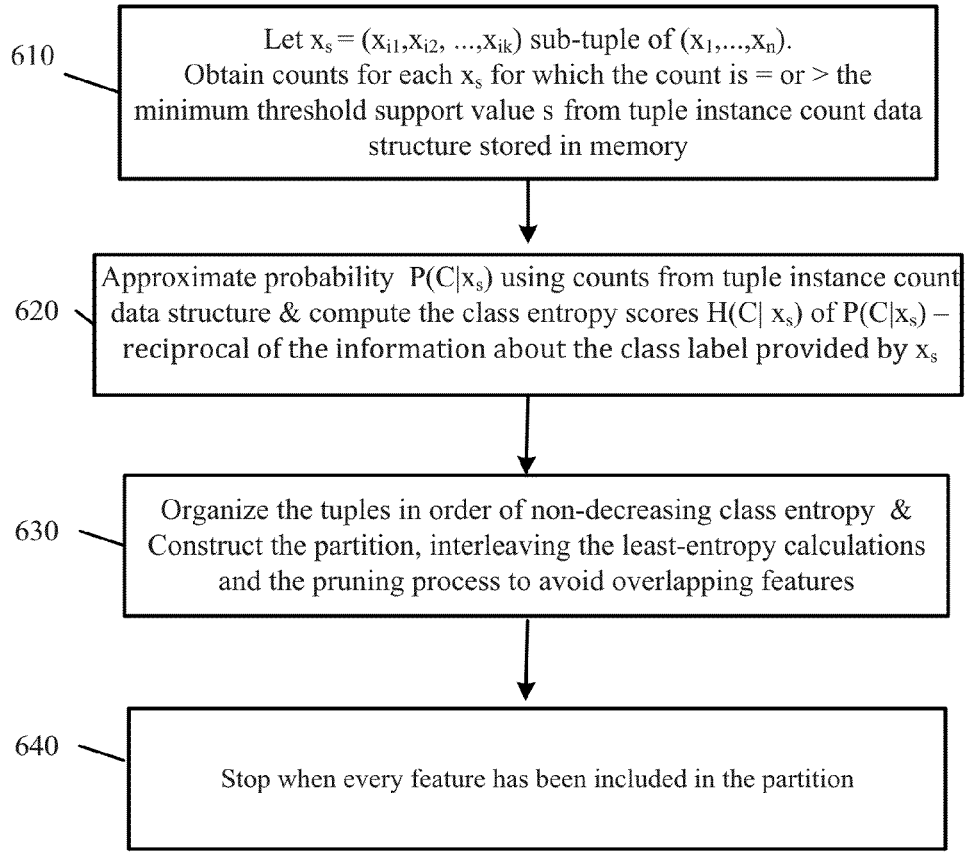
FIG. 6A illustrates a flowchart of a method for partitioning sets of features using class entropy scores.

FIG. 6A illustrates a flowchart of one implementation 600 of a system for partitioning sets of features for a Bayesian classifier that computes class entropy scores. Other implementations may perform the steps in different orders and/or with different, fewer or additional steps than the ones illustrated in FIG. 6A. The actions described below can be subdivided into more steps or combined into fewer steps to carry out the method described using a different number or arrangement of steps.

At action 610, $x_s=(x_{i1}, x_{i2}, \ldots, x_{ik})$ denotes any particular sub-tuple of $(x_i, \ldots, x_n)$ where s is the index set of this sub-tuple, and counts from the tuple instance count data structure for $x_s$ are compared to the minimum threshold support value used during training. At action 620, the predictive power and entropy computation engine 125 computes the class entropy scores using counts from the tuple instance count data structure and calculates the entropy $H(C|x_s)$ of $P(C|x_s)$—a measure of the reciprocal of the information about a class label provided by $x_s$.

At action 630, the tuple ordering engine 122 organizes the tuples in order of non-decreasing class entropy and the partition generation engine 128 constructs the partition, interleaving the least-entropy calculations and the pruning process to avoid overlapping features At action 640, the partitioning system stops when every feature has been included in the partition. The resulting partition list can be stored in a memory, for use with a classifier.

Figure 6B:
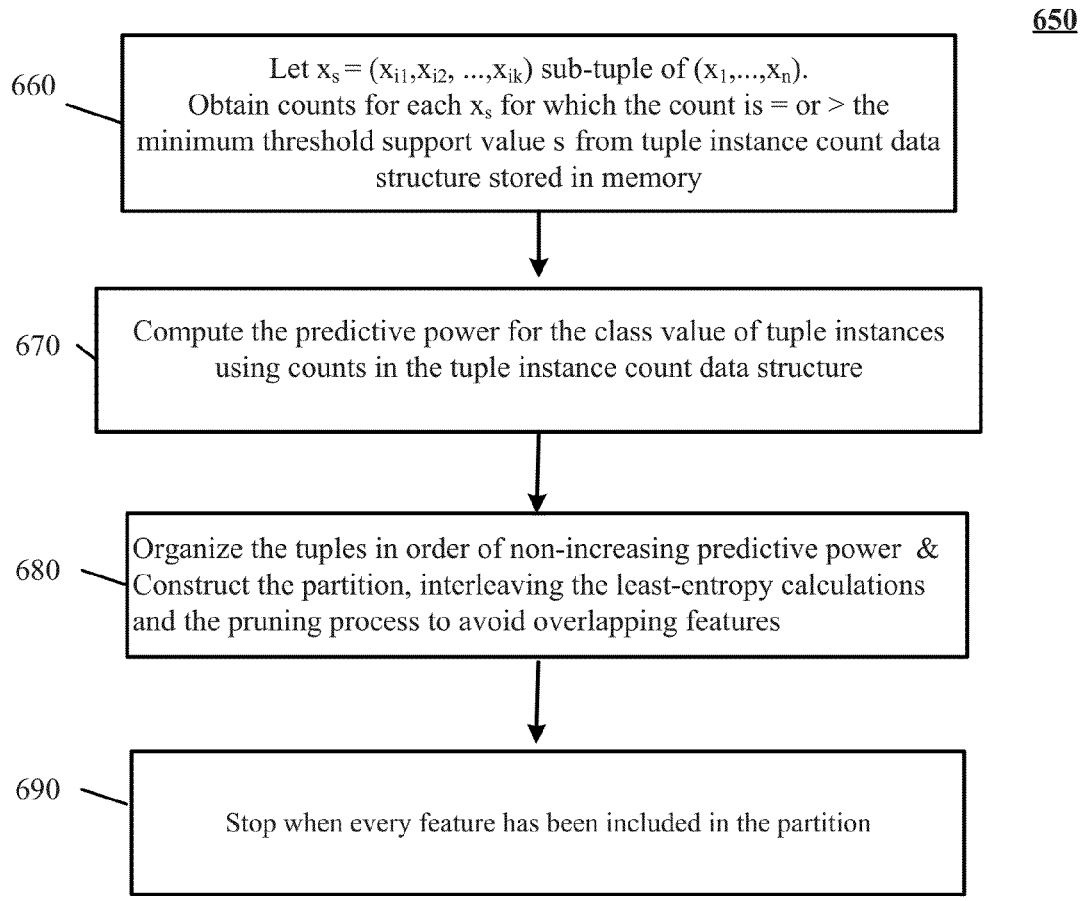
FIG. 6B illustrates a method variation for a system for partitioning sets of features using predictive power for class values.

FIG. 6B illustrates a flowchart of another implementation 650 of a system for partitioning sets of features for a Bayesian classifier that computes the predictive power for the class value. At action 660, $x_s=(x_{i1}, x_{i2}, \ldots, x_{ik})$ denotes any particular sub-tuple of $(x_i, \ldots, x_n)$ where s is the index set of this sub-tuple, and counts from the tuple instance count data structure for $x_s$ are compared to the minimum threshold support value used during training. At action 670, the predictive power and entropy computation engine 125 computes the predictive power for the class value of tuple instances using counts from the tuple instance count data structure. At action 680, the tuple ordering engine 122 organizes the tuples in order of non-increasing predictive power and the partition generation engine 128 constructs the partition, interleaving the least-entropy calculations and the pruning process to avoid overlapping features. At action 690, the partitioning system stops when every feature has been included in the partition. The resulting partition list can be stored in a memory, for use with a classifier.

Flowcharts for Starting with a Simpler Partition & Processing a Complete Training Set To discover feature combinations for a specific training set for external use, we use a batch method. A batch method finds a good partition by evaluating over an entire training set, in contrast to discovering a partition for a single specific input tuple. Batch training requires more time but has the advantage that it produces a partition that can be applied to external data sets. Since the effectiveness of a batch partition is evaluated on the training set, such a partition tends to be more robust than one produced by a partition based on a single input tuple.

An alternative initial setup for partitioning sets of features is to begin with simpler partitions and then to evolve the partitions incrementally. This disclosed method variation begins with initial partitions that correspond to the NBC assumption of independence between partitions. That is, start with singletons partition $p=\{\{x_1\}, \{x_2\}, \ldots, \{x_n\}\}$.

Figure 7:
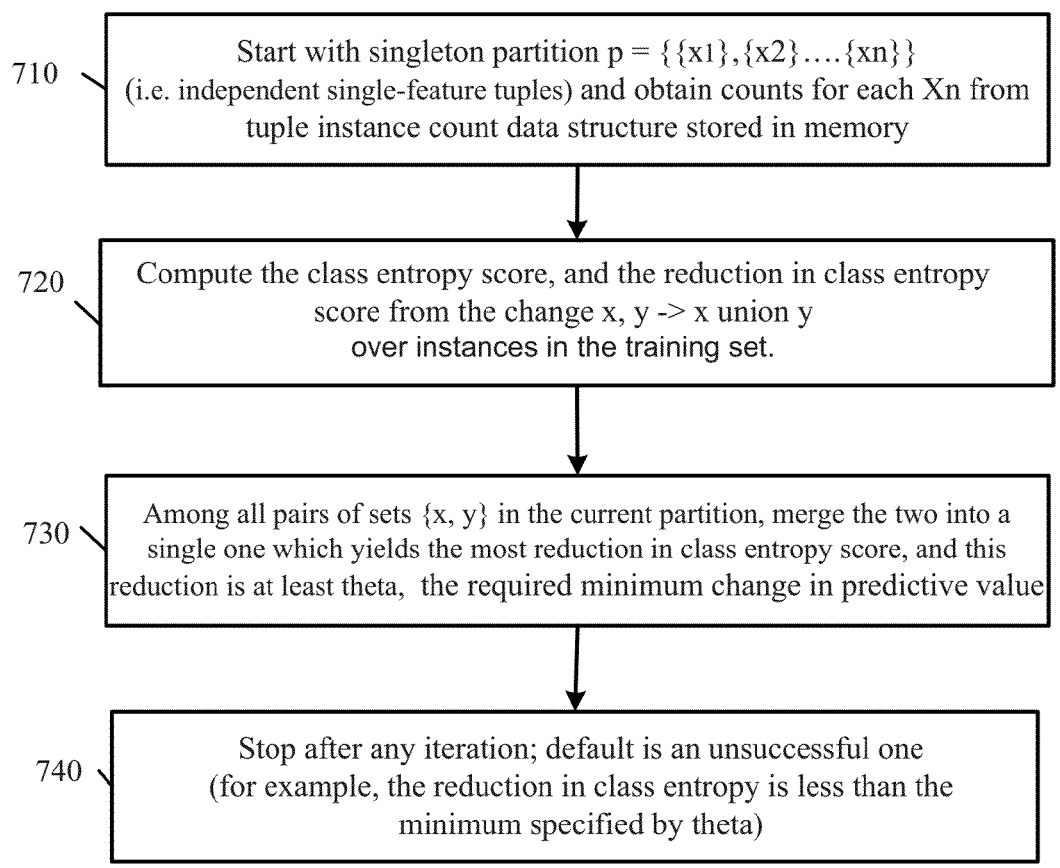
FIG. 7 illustrates a method variation for a system for partitioning sets of features using class entropy scores for a complete training set.

FIG. 7 illustrates a flowchart of one implementation 700 of an system for partitioning sets of features for a Bayesian classifier—using class entropy scores. Other implementations may perform the steps in different orders and/or with different, fewer or additional steps than the ones illustrated in FIG. 7. The actions described below can be subdivided into more steps or combined into fewer steps to carry out the method described using a different number or arrangement of steps.

This disclosed implementation 700 for finding partitions uses a parameter $\theta$, provided to the system, to specify a minimum change in predictive value before tuples will be merged. The value of $\theta$ depends on the use case for the data set being classified. For values of $\Theta>0$ the resultant classification algorithm finds partitions whose predictive accuracy is greater than the results available when using NBC partitions for the same data set.

At action 710, start with singleton partition $p=\{\{x1\}, \{x2\} \ldots \{xn\}\}$ (i.e. independent combination of single-feature tuples) and obtain counts for each Xn from the tuple instance count data structure.

At action 720, compute the probability of the class given x union y, and the reduction in entropy from the change x, y→x union y for the given instance. The predictive power and entropy computation engine 125 computes the distribution $P(C|x \cup y)$, the entropy, and the reduction in entropy, as described below.

$$P_{NB}(C|x,y)=P(x|C)P(y|C)P(C)/Z \quad (5)$$

$P_{NB}(C|x,y)$ is the posterior distribution (over the classes C) for a NBC classifier trained on an input space made up of the two independent features X and Y, when evaluated on input (x,y). $P(C|x \cup y)$ is the posterior distribution over the classes when the two sets are combined.

$P(C|x \cup y)$ is readily computed from the counts in the tuple instance count data structure for $(x \cup y, c)$, $c \in C$. In equation (5), $P(x|c)$ is the count for $x \cup c$ divided by the count for c. $P(y|c)$ is calculated similarly. $P(c)$ is the count for c divided by the sum of the counts over $c' \in C$, and Z is the sum of the numerators in equation (5) over $c \in C$.

The reduction in entropy from the change x,y→x∪y is $$\Delta H=H(P_{NB}(C|x,y))-H(C|x \cup y) \quad (6)$$

At action 730, among all pairs of sets {x, y} in the current partition, merge the two into a single one which yields the most reduction in class entropy score, and this reduction is at least theta, the minimum change in predictive value.

At action 740, the partition method stops after any iteration, typically an unsuccessful one; for example, the reduction in class entropy score is less than the minimum change in predictive value $\theta$. The method identifies a partition that provides the highest improvement in predictive accuracy.

Figure 8:
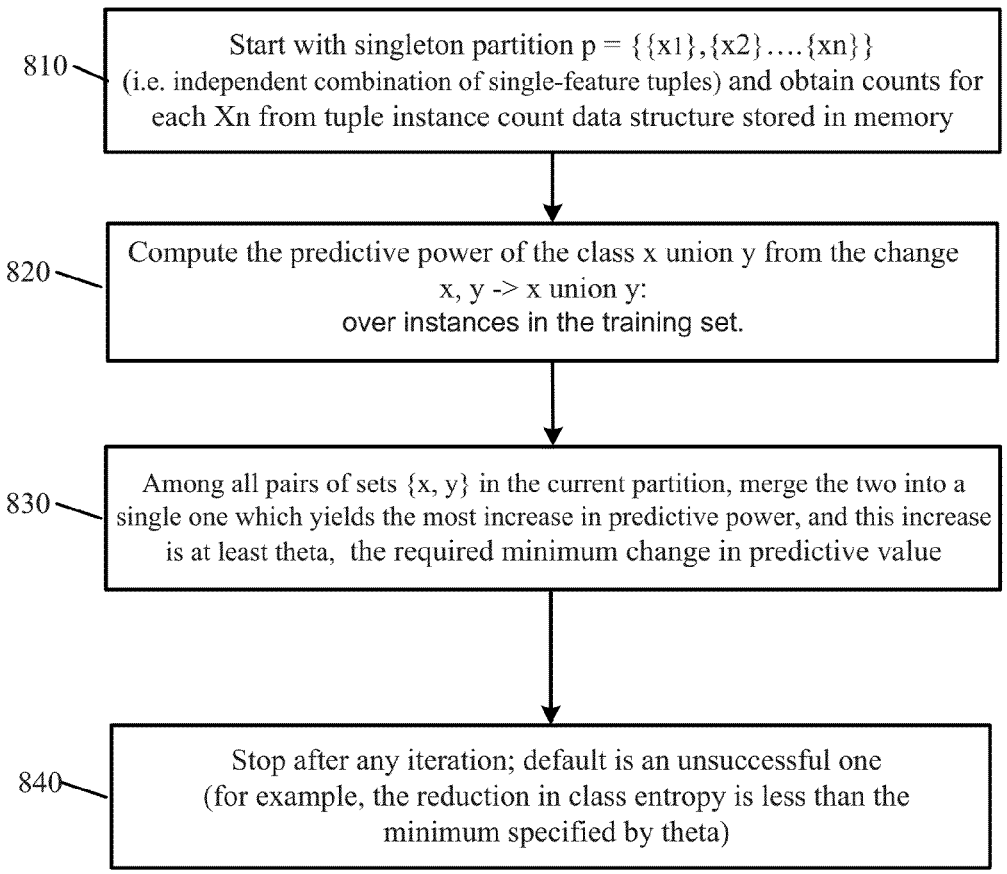
FIG. 8 illustrates a method for partitioning sets of features using predictive power for class values for a complete training set.

FIG. 8 illustrates a flowchart of another implementation 800 of a system for partitioning sets of features for a Bayesian classifier—using predictive power for class values. Other implementations may perform the steps in different orders and/or with different, fewer or additional steps than the ones illustrated in FIG. 8. The actions described below can be subdivided into more steps or combined into fewer steps to carry out the method described using a different number or arrangement of steps.

At action 810, start with singleton partition p={{x₁}, {x₂} ... {xₙ}} (i.e. independent combination of single-feature tuples) and obtain counts for each $X_n$ from the tuple instance count data structure.

At action 820, the predictive power and entropy computation engine 125 computes the predictive power when two tuples x and y are merged into a single one x ∪ y. The pruning engine 118 discards pairs in which the threshold support of x, y, or x ∪ y is too low—in the same way described supra.

At action 830, among all pairs of sets {x, y} in the current partition, merge the two into a single one which yields the most increase in predictive power, where this increase is at least theta, the minimum change in predictive value.

At action 840, the partition system stops after any iteration, typically an unsuccessful one; for example, the increase in predictive power is less than the minimum change in predictive value θ. The system identifies a partition that provides the highest improvement in predictive accuracy. The resulting partition list can be stored in a memory, for use with a classifier.

One reason for using the disclosed batch system is to discover features that serve well for a separate classifier. The disclosed batch system was used to identify some combinations of the features, described in the Use Cases section above, that predict more accurately than the features used independently. As a noteworthy example, we discovered the feature combination {IPBL3, IPBL4}. Our interpretation of this discovery is that the combination of the third and the fourth block of the IP address is an especially good predictor of fraud.

In the process of applying the disclosed batch partition finding method to the problem of identifying fraudulent registrations it was discovered that replacing entropy in equations (6) and (7) by "probability of the class fraudulent" worked better: H(C|x∪y) replaced by P(fraudulent|x∪y) and $H(P_{NB}(C|x,y))$ by $P_{NB}(fraudulent|x,y)$. The intuitive explanation of this is that the fraud classification problem involves discovering signal (fraud) in a background of noise (non-fraudulent) in a setting in which the signal-to-noise ratio is small. That is, most users are non-fraudulent. Using the replacement measures to characterize effectiveness discovers those combinations of features that improve the fraud detection accuracy, i.e. help discover signal (rather than noise) better.

Computer System

FIG. 9 is a block diagram of an example computer system 900 that includes systems and methods for partitioning sets of features for a Bayesian classifier. Computer system 910 typically includes at least one processor 972 that communicates with a number of peripheral devices via bus subsystem 950. These peripheral devices can include a storage subsystem 926 including, for example, memory devices and a file storage subsystem, user interface input devices 938, user interface output devices 978, and a network interface subsystem 976. The input and output devices allow user interaction with computer system 910. Network interface subsystem 976 provides an interface to outside networks, including an interface to corresponding interface devices in other computer systems.

User interface input devices 938 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include possible types of devices and ways to input information into computer system 910.

User interface output devices 978 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 910 to the user or to another machine or computer system.

Storage subsystem 926 stores programming and data constructs that provide the functionality of some or all of the modules and methods described herein. These software modules are generally executed by processor 972 alone or in combination with other processors.

Memory 922 used in the storage subsystem can include a number of memories including a main random access memory (RAM) 934 for storage of instructions and data during program execution and a read only memory (ROM) 932 in which fixed instructions are stored. A file storage subsystem 936 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 136 in the storage subsystem 924, or in other machines accessible by the processor.

Bus subsystem 950 provides a mechanism for letting the various components and subsystems of computer system 910 communicate as intended. Although bus subsystem 650 is shown schematically as a single bus, alternative implementations of the bus subsystem can use multiple busses.

Computer system 910 can be of varying types including a workstation, server, computing cluster, blade server, server farm, or any other data processing system or computing device. Due to the ever-changing nature of computers and networks, the description of computer system 910 depicted in FIG. 9 is intended only as one example. Many other configurations of computer system 910 are possible having more or fewer components than the computer system depicted in FIG. 9.

Particular Implementations

In one implementation, a method is described of building a partition of features in an input set, in which feature subsets listed in a partition list have probabilistic interdependence among features in the feature subset. The method includes accessing an input set including an input tuple comprising feature-values assigned to features; identifying input subtuples comprising unique feature subsets in the input tuple; accessing a tuple instance count data structure stored in memory that provides counts of tuples in a data set; computing class entropy scores for the input subtuples that have at least a threshold support count of instances in the tuple instance count data structure; and adding feature subsets corresponding to the input subtuples to a partition list. This process includes ordering at least some of the input subtuples by non-decreasing class entropy score; traversing the ordered input subtuples, including: adding the feature subset of a current ordered input subtuple to the partition list, and pruning from subsequent consideration other input subtuples that include any features in the current ordered input subtuple; and reaching completion when all of the features of the input tuple have been added to the partition list. The partition list can be stored in a memory, whereby it becomes available to use with a classifier.

The method includes a tuple instance count data structure that includes tuple instances, class values and counts; and the input tuple includes a class label that accepts an assigned class value.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with threshold support counts, class entropy reduction thresholds, etc.

The disclosed technology can also be presented from the perspective of computing predictive power for the class value of tuple instances using counts in the tuple instance count data structure. For this method, ordering of at least some of the tuple instances is by non-decreasing predictive power, and reaching completion when all supported features of the data set have been added to the partition list. As in the method described earlier, the partition list can be stored in a memory, whereby it becomes available to use with a classifier.

Another disclosed method of building a partition of features in a data set into feature subsets with probabilistic interdependence among features in each feature subset, includes accessing a tuple instance count data structure stored in memory; accessing an input set including an input tuple; enumerating pairs of singleton input features in the input tuple for at least the input features having assigned feature-values; beginning with the singleton input features as pending feature subsets in a partition list. The method continues, repeatedly merging pairs of pending feature subsets in the partition list, including: computing reduction in class entropy scores that would result from merging the pairs of pending feature subsets using the tuple instance count data structure, limiting consideration of mergers resulting in merged feature subsets that have at least a threshold support count of instances in the tuple instance count data structure; selecting a selected pair of pending feature subsets that yields a reduction in class entropy score resulting from merger, wherein the reduction in class entropy score meets a predetermined class entropy reduction threshold; merging the selected pair of feature subsets into a merged pending feature subset in the partition list; and reaching completion when available mergers of pending feature subsets would not produce a decrease in entropy that meets the predetermined class entropy reduction threshold. The partition list can be stored in a memory, whereby it becomes available to use with a classifier.

This method and other implementations of the technology disclosed can include one or more of the following features and/or features described in connection with additional methods disclosed. The method further includes choosing the selected pair of pending feature subsets that yields a greatest reduction in class entropy among pairs of pending feature subsets available for merger.

The methods disclosed above can also be presented from the perspective of computing predictive power for the class value of tuple instances using counts in the tuple instance count data structure. For this method, ordering of at least some of the tuple instances is by non-decreasing predictive power, and reaching completion when all supported features of the data set have been added to the partition list. As in the method described earlier, the partition list can be stored in a memory, whereby it becomes available to use with a classifier.

Bridging the methods described above, the technology disclosed heuristically determines a partitioning of features in a data set into feature subsets, so that feature subsets have probabilistic interdependence among included features that can be used when building a classifier to classify the data in the data set. The heuristics use a tuple instance count data structure stored in memory that provides counts of tuples in a data set. The counts in the data structure are used to calculate improvement in classification power resulting from treating multiple features as a feature subset in the partition. Combinations of features into feature subsets are considered at least until each of the features has become part of a feature subset with multiple features or has been explicitly or implicitly rejected for combination into a feature subset with multiple features. Classification power is a term that bridges the entropy and predictive power alternative calculations based on counts in the tuple instance count data structure.

In one heuristic implementation, feature subsets are considered in an order based on evaluation of improvement in classification using the count data in the tuple instance count data structure. Further consideration of feature subsets from the ordering can terminate when the potential improvement in classification power drops below a threshold of improvement in classification power.

In another heuristic implementation, feature subsets are considered as combinations of singletons or previously combined feature subsets. Further combination is rejected when none of the candidate combinations produces an improvement in classification power that exceeds a threshold of improvement in classification power.

In some implementations, the improvement in classification power corresponds to a decrease in entropy calculated from the tuple instance count data structure. In other implementations, the improvement in classification power corresponds to an increase in predictive power calculated from the tuple instance count data structure.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

While the present technology is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the technology and the scope of the following claims.

The invention claimed is:

1. A method of building a partition of features in an input set, in which feature subsets listed in a partition list have probabilistic interdependence among features in the feature subset, the method including:
   accessing an input set including at least one input tuple comprising feature-values assigned to features;
   identifying input subtuples comprising unique feature subsets in the input tuple;
   accessing a tuple instance count data structure stored in memory that provides counts of tuples in a data set;
   computing class entropy scores for the input subtuples that have at least a threshold support count of instances in the tuple instance count data structure;
   adding feature subsets corresponding to the input subtuples to a partition list, including:
      ordering at least some of the input subtuples by non-decreasing class entropy score;

traversing the ordered input subtuples, including:
adding the feature subset of a current ordered input subtuple to the partition list, and
pruning from subsequent consideration other input subtuples that include any features in the current ordered input subtuple; and
reaching completion when all of the features of the input tuple have been added to the partition list; and
storing the partition list in a memory, whereby it becomes available to use with a classifier.

2. The method of claim 1, further including the threshold support count being in a range of 2 to 10, inclusive, thereby requiring at least 2 to 10 instances of feature-values in the input subtuples to be present in the tuple instance count data structure.

3. The method of claim 1, wherein:
the tuple instance count data structure includes tuple instances, class values and counts; and
the input tuple includes a class label that accepts an assigned class value.

4. The method of claim 2, wherein the tuple instance count data structure is subject to a minimum threshold support count and returns non-zero counts for tuple instances that have a count in the data set that meets the minimum support threshold.

5. A method of building a partition of features in a data set into feature subsets with probabilistic interdependence among features in each feature subset, the method including:
accessing a tuple instance count data structure stored in memory;
accessing a class value to use;
computing predictive power for the class value of tuple instances using counts in the tuple instance count data structure for supported tuples among the tuple instances that have at least a threshold support of count instances;
adding feature subsets corresponding to the supported tuples to a partition list, including:
ordering at least some of the tuple instances by non-increasing predictive power;
traversing the ordered tuple instances, including:
adding the feature subset of a current ordered input subtuple to the partition list, and
pruning from subsequent consideration other input subtuples that include any features in the current ordered input subtuple; and
reaching completion when all supported features of the data set have been added to the partition list; and
storing the partition list in a memory, whereby it becomes available to use with a classifier.

6. The method of claim 5, further including the supported tuples satisfying a threshold support count being in a range of 2 to 10, inclusive, thereby requiring at least 2 to 10 instances of feature-values in the supported tuples to be present in the tuple instance count data structure.

7. The method of claim 5, wherein:
the tuple instance count data structure includes tuple instances, class values and counts.

8. A method of building a partition of features in a data set into feature subsets with probabilistic interdependence among features in each feature subset, the method including:
accessing a tuple instance count data structure stored in memory;
accessing an input set including at least one input tuple comprising feature-values assigned to features;
beginning with singleton input features present in the input set as pending feature subsets in a partition list, repeatedly merging pairs of pending feature subsets in the partition list, including:
computing reduction in class entropy scores that would result from merging the pairs of pending feature subsets using the tuple instance count data structure, limiting consideration of mergers resulting in merged feature subsets to the mergers that have at least a threshold support count of instances in the tuple instance count data structure;
selecting a selected pair of pending feature subsets that yields a reduction in class entropy score resulting from merger, wherein the reduction in class entropy score meets a predetermined class entropy reduction threshold;
merging the selected pair of feature subsets into a merged pending feature subset in the partition list; and
reaching completion when available mergers of pending feature subsets would not produce a decrease in entropy that meets the predetermined class entropy reduction threshold; and
storing the partition list in the memory, whereby it becomes available to use with a classifier.

9. The method of claim 8, further including selecting the selected pair of pending feature subsets that yields a greatest reduction in class entropy among pairs of pending feature subsets available for merger.

10. The method of claim 8, further including the threshold support count for the merged feature subsets being in a range of 2 to 10, inclusive, thereby requiring at least 2 to 10 instances of feature-values in the merged feature subsets to be present in the tuple instance count data structure.

11. The method of claim 8, wherein:
the tuple instance count data structure includes tuple instances, class values and counts; and
the input tuple includes a class label that accepts an assigned class value.

12. A method of building a partition of features in a data set into feature subsets with probabilistic interdependence among features in each feature subset, the method including:
accessing a tuple instance count data structure stored in memory;
accessing a class value to use;
beginning with singleton feature subsets as pending feature subsets in a partition list, repeatedly merging pairs of the pending feature subsets in the partition list, including:
computing increase in class predictive power for the class value that would result from merging the pairs of pending feature subsets using the tuple instance count data structure, limiting consideration of mergers to the mergers resulting in merged feature subsets that have at least a threshold support count of instances of the class value for the pairs of pending feature subsets;
selecting a selected pair of feature subsets which yields an increase in predictive power for the class value that meets a predetermined predictive power increase threshold;
merging the selected pair of feature subsets into a merged single feature subset in the partition list; and
reaching completion when available mergers of pending feature subsets would not produce an increase in predictive power that meets the predetermined predictive power increase threshold; and
storing the partition list in the memory, whereby it becomes available to use with a classifier.

13. The method of claim 12, further including selecting the selected pair of feature subsets that yields a greatest increase in predictive power for the class value among pairs of feature subsets available for merger.

14. The method of claim 12, further including the threshold support count for the merged feature subsets being in a range of 2 to 10, inclusive, thereby requiring at least 2 to 10 instances of feature-values in the merged feature subsets to be present in the tuple instance count data structure.

15. The method of claim 12, wherein:
   the tuple instance count data structure includes tuple instances, class values and counts.

* * * * *